(12) United States Patent
Maehashi

(10) Patent No.: US 10,230,915 B2
(45) Date of Patent: Mar. 12, 2019

(54) IMAGE CAPTURING APPARATUS AND IMAGE CAPTURING SYSTEM

(71) Applicant: CANON KABUSHIKI KAISHA, Tokyo (JP)

(72) Inventor: Yu Maehashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/492,560

(22) Filed: Apr. 20, 2017

(65) Prior Publication Data
US 2017/0318248 A1 Nov. 2, 2017

(30) Foreign Application Priority Data
Apr. 27, 2016 (JP) .................................. 2016-089723

(51) Int. Cl.
*H04N 5/378* (2011.01)
(52) U.S. Cl.
CPC .................................. *H04N 5/378* (2013.01)
(58) Field of Classification Search
CPC .................................................... H04N 5/378
See application file for complete search history.

(56) References Cited

U.S. PATENT DOCUMENTS

2015/0194973 A1* 7/2015 Furuta ................... H03M 1/002
348/308

FOREIGN PATENT DOCUMENTS

JP 2009-171397 A 7/2009

OTHER PUBLICATIONS

Kei Shiraishi, et al., "Temporal Noise 3D-Stacked CMOS Image Sensor (ISSCC2016-06_Visuals)," 2016 IEEE International Solid-State Circuits Conference, Toshiba Corp., Kawasaki, Japan, pp. 1-19.
Kei Shiraishi, et al., "Temporal Noise 3D-Stacked CMOS Image Sensor (ISSCC2016-06_Digest)" 2016 IEEE International Solid-State Circuits Conference, Toshiba Corp., Kawasaki, Japan pp. 122-124.

* cited by examiner

*Primary Examiner* — Twyler L Haskins
*Assistant Examiner* — Fayez Bhuiyan
(74) *Attorney, Agent, or Firm* — Canon U.S.A., Inc. IP Division

(57) ABSTRACT

An image capturing apparatus includes a comparison circuit unit including a first comparator and a second comparator. The second comparator is kept in a non-operating state until the signal level of a first comparison result signal from the first comparator changes and is brought into an operating state in correspondence with a change in the signal level of the first comparison result signal.

25 Claims, 9 Drawing Sheets

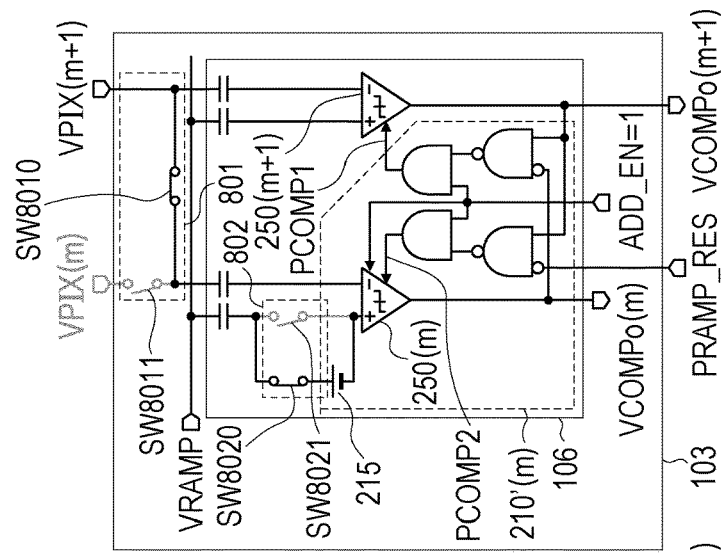
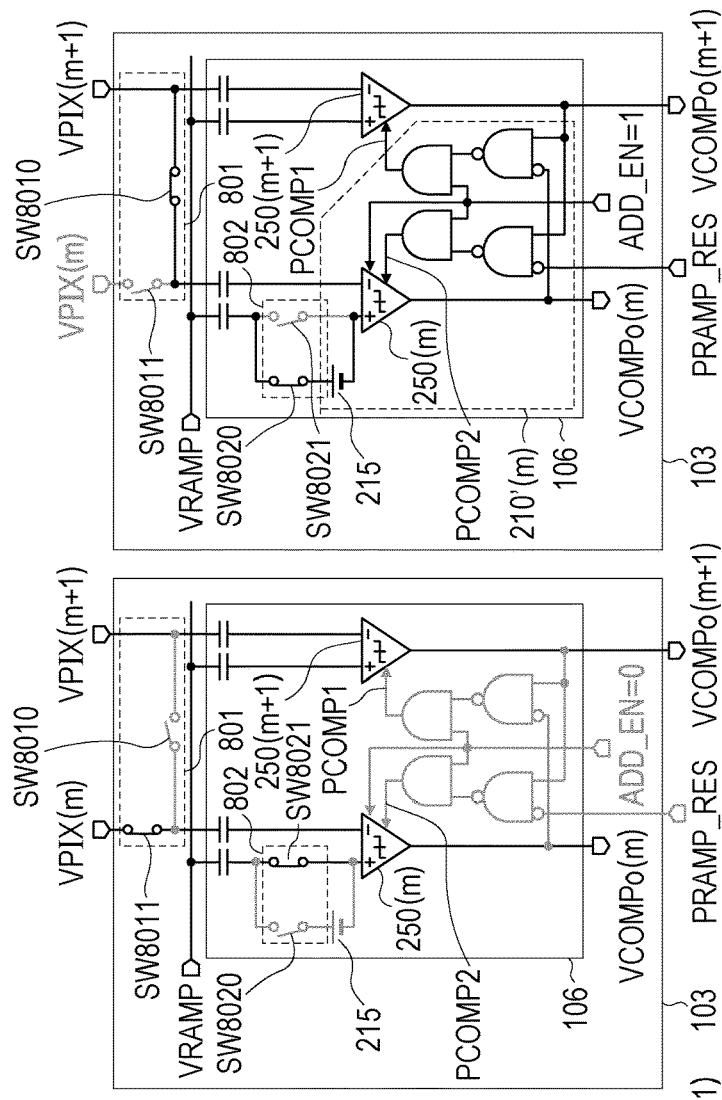
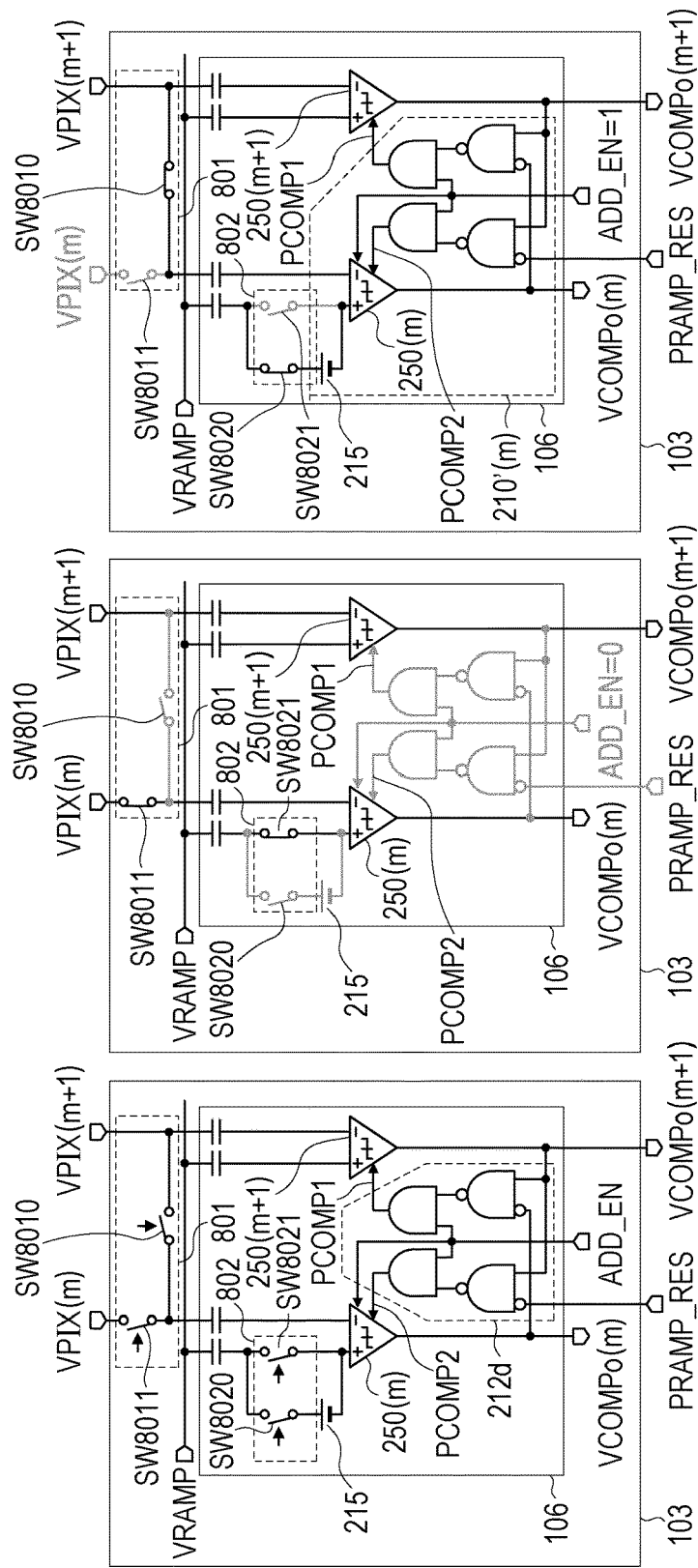

IMAGE CAPTURING APPARATUS AND IMAGE CAPTURING SYSTEM

BACKGROUND OF THE INVENTION

Field of the Invention

The present disclosure relates to an image capturing apparatus including a plurality of analog-to-digital conversion units and an image capturing system including the image capturing apparatus.

Description of the Related Art

There is a known image capturing apparatus including a plurality of pixels disposed in a plurality of columns and a plurality of analog-to-digital conversion units disposed in correspondence with the columns of pixels.

The analog-to-digital conversion units each include a comparator that compares pixel signals output from the pixels and ramp signals whose potential monotonously changes with the lapse of time. Studies to reduce the current consumption per unit time of this comparator have been made.

An image capturing apparatus disclosed in Japanese Patent Laid-Open No. 2009-171397 (Patent Literature 1) has a configuration in which each comparator includes a first amplifier and a second amplifier that receives a signal from the first amplifier and outputs a signal indicating the result of comparison between pixel signals and ramp signals. The image capturing apparatus disclosed in Patent Literature 1 starts the comparison between the pixel signals and the ramp signals with the comparator using the amount of current supplied to the second amplifier as a first current amount. When the signal level of a signal output from the first amplifier changes, the amount of current supplied to the second amplifier is increased from the first current amount to a second current amount. After a predetermined period of time, the amount of current to be supplied to the second amplifier is returned to the first current amount. Thus, the image capturing apparatus disclosed in Patent Literature 1 can reduce in current consumption per unit time of the second amplifier as compared with a case in which the second current amount is supplied to the second amplifier over the whole period in which the pixel signals and the ramp signals are compared.

In the image capturing apparatus disclosed in Patent Literature 1, the current consumption per unit time of the second amplifier, which is only part of the circuit of each comparator, is reduced, whereas the current consumption per unit time of the first amplifier, which is the other part of the circuit, is not reduced. For that reason, the image capturing apparatus disclosed in Patent Literature 1 has room for further reducing the power consumption of the comparators during the analog-to-digital conversion period.

SUMMARY OF THE INVENTION

An image capturing apparatus according to an aspect of the present disclosure includes a pixel, an analog-to-digital conversion unit, and a ramp-signal supplying unit configured to output a ramp signal whose potential changes with the lapse of time. The pixel outputs a pixel signal. The analog-to-digital conversion unit includes an offset imparting unit, a first comparator, and a second comparator. The offset imparting unit imparts an offset to at least one of the pixel signal and the ramp signal. The first comparator performs first comparison that is comparison between the pixel signal and the ramp signal and outputs a first comparison result signal indicating a result of the first comparison. At least one of the pixel signal and the ramp signal is offset by the offset imparting unit. The second comparator performs second comparison that is comparison between the pixel signal and the ramp signal and outputs a second comparison result signal indicating a result of the second comparison. In the analog-to-digital conversion unit, the first comparison result signal and the second comparison result signal change in signal level in that order due to the offset during an analog-to-digital conversion period from start of a change in potential of the ramp signal to end of the change. The second comparator is in a non-operating state during a period from start of the analog-to-digital conversion period until the signal level of the first comparison result signal changes. The second comparator enters an operating state in correspondence with a change in the signal level of the first comparison result signal to perform the second comparison. Current consumption per unit time of the first comparison is lower than current consumption per unit time of the second comparison.

Further features of the disclosure will become apparent from the following description of exemplary embodiments with reference to the attached drawings.

BRIEF DESCRIPTION OF THE DRAWINGS

FIG. 8A is a diagram illustrating the configuration of a column circuit of a third embodiment.

FIG. 8B is a diagram illustrating the connection state of the switches of the column circuit in a first operation.

FIG. 8C is a diagram illustrating the connection state of the switches of the column circuit 103 in a second operation.

DESCRIPTION OF THE EMBODIMENTS

The embodiments described below relate to a technique for reducing the power consumption of the comparators during the analog-to-digital conversion period.

The individual embodiments will be described with reference to the drawings.

First Embodiment

Figure 1:
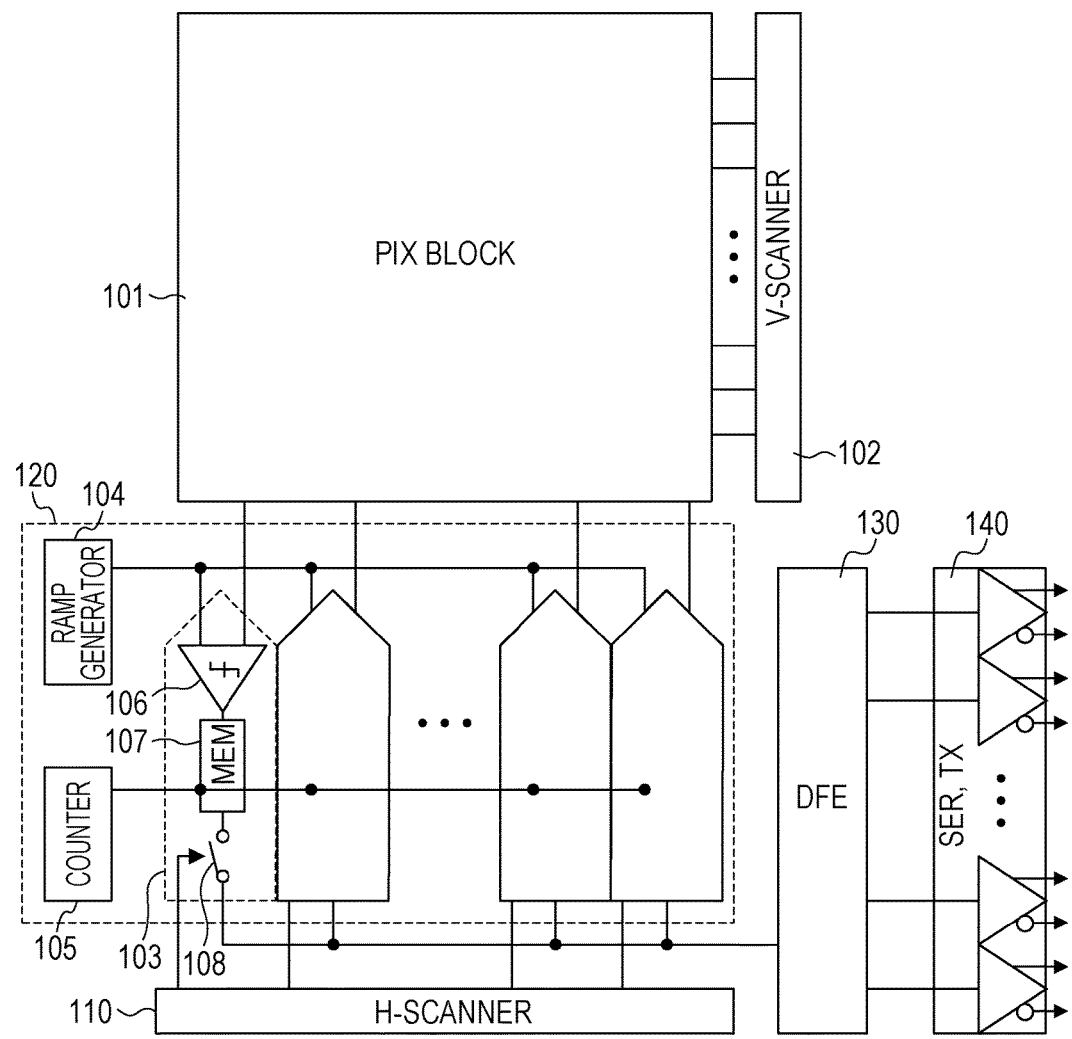
FIG. 1 is a diagram illustrating the configuration of an image capturing apparatus of a first embodiment.

FIG. 1 is a diagram illustrating the configuration of an image capturing apparatus of a first embodiment.

The image capturing apparatus includes a pixel block 101 (Pix Block) in which pixels are arrayed in a plurality of rows and a plurality of columns. The image capturing apparatus further includes a vertical scanning circuit 102 (V-Scanner) that selects pixels by row and reads pixel signals from the pixels by row. The image capturing apparatus further includes a plurality of column circuits 103. The plurality of column circuits 103 are disposed in correspondence with the plurality of columns of the pixel block 101 in which the pixels are arrayed. The plurality of column circuits 103 each include a comparison circuit unit 106, a memory (MEM) 107, and a switch 108. Each of the plurality of column circuits 103 is an analog-to-digital conversion unit that converts pixel signals to digital signals. The image capturing apparatus further includes a ramp-signal supplying unit 104 (Ramp Generator). The ramp-signal supply unit 104 is connected to the comparison circuit unit 106 of each of the plurality of column circuits 103. The comparison circuit unit 106 is also connected to pixels of its corresponding column. A counter 105 is connected to the memory 107 of each of the plurality of column circuits 103. The image capturing apparatus further includes a horizontal scanning circuit (H-Scanner) 110. The plurality of column circuits 103, the ramp-signal supply unit 104, and the counter 105 are disposed in a peripheral circuit area 120. The horizontal scanning circuit 110 controls the switch 108 of each of the plurality of column circuits 103. The plurality of column circuits 103 are connected to a digital front end (DFE) 130. The DFE 130 is connected to an output unit 140. Signals output from the output unit 140 are signals that the image capturing apparatus outputs.

Figure 2:
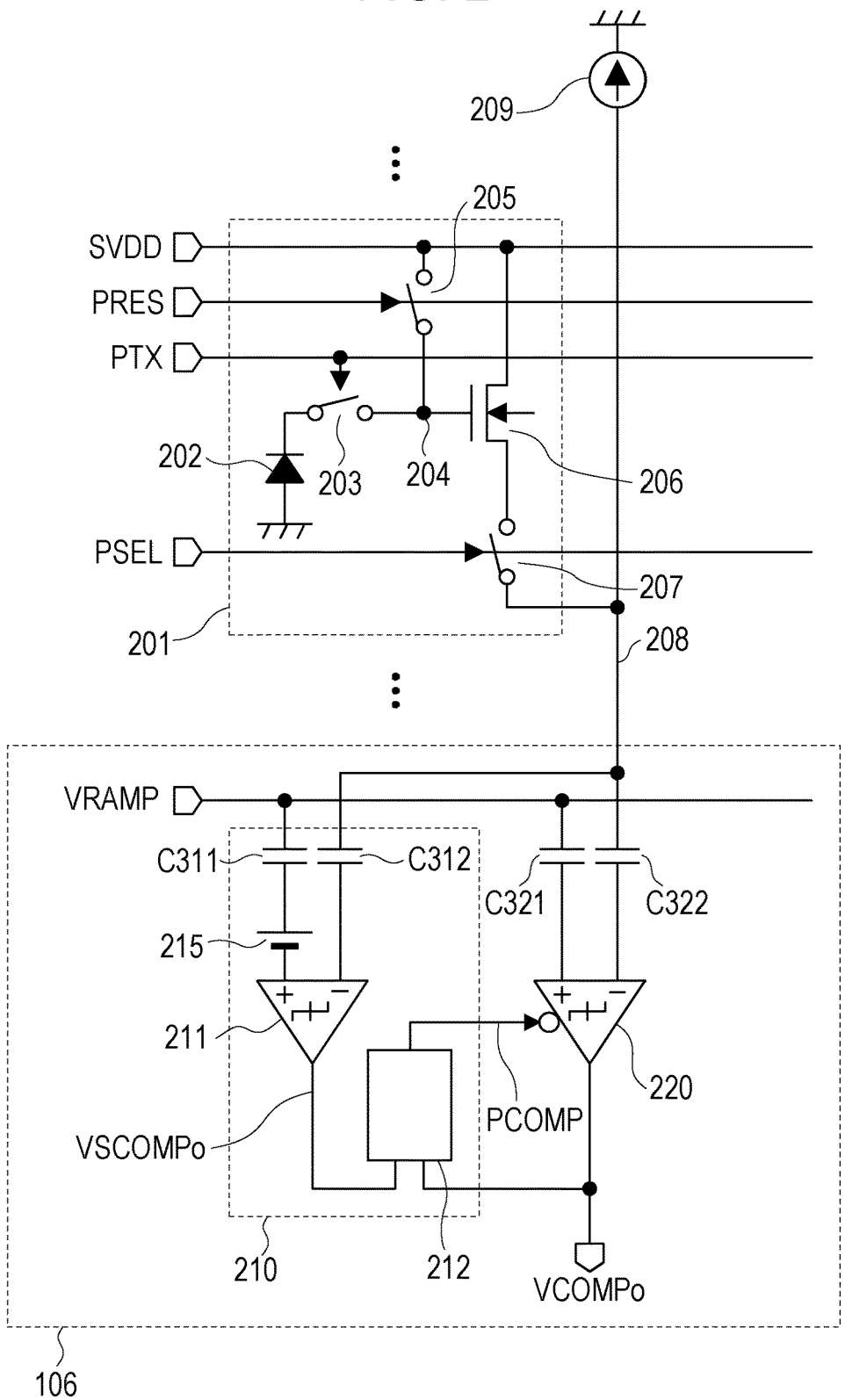
FIG. 2 is a diagram illustrating the configuration of a pixel and a comparison circuit unit.

FIG. 2 is a diagram illustrating the configuration of a pixel 201 and the comparison circuit unit 106.

The pixel 201 includes a photodiode 202, a transfer switch 203, a reset switch 205, an amplifying transistor 206, and a selection switch 207. One node of the transfer switch 203, one node of the reset switch 205, and the gate of the amplifying transistor 206 are connected to a common node 204. The photodiode 202 is one example of a photoelectric conversion unit that generates an electric charge corresponding to the amount of incident light. The node 204 can be formed as a floating diffusion capacitor. A pixel power supply voltage SVDD is input to the other node of the reset switch 205 and the other node of the amplifying transistor 206.

The transfer switch 203 is controlled by a signal PTX supplied from the vertical scanning circuit 102. The reset switch 205 is controlled by a signal PRES supplied from the vertical scanning circuit 102. The selection switch 207 is controlled by a signal PSEL supplied from the vertical scanning circuit 102.

The selection switch 207 is connected to a signal line 208. The signal line 208 is connected to a current source 209. When the signal PSEL goes to an active level to bring the selection switch 207 into a conducting state, a current is supplied from the current source 209 to the amplifying transistor 206. The pixel power supply voltage SVDD, the amplifying transistor 206, and the current source 209 form a source follower circuit.

The comparison circuit unit 106 includes a capacitive element C311, a capacitive element C312, an offset imparting unit 215, a first comparator 211, and a logic circuit 212 that constitute a comparison control circuit 210. The comparison circuit unit 106 further includes a capacitive element C321, a capacitive element C322, and a second comparator 220. One input node of the first comparator 211 is connected to the signal line 208 via the capacitive element C312. One input node of the second comparator 220 is connected to the signal line 208 via the capacitive element C322.

The other input node of the first comparator 211 is supplied with a signal VRAMP via the capacitive element C311 and the offset imparting unit 215. The other input node of the second comparator 220 is supplied with the signal VRAMP via the capacitive element C321. The signal VRAMP is a signal supplied from the ramp-signal supply unit 104.

The output node of the first comparator 211 is connected to one input node of the logic circuit 212. The output node of the second comparator 220 is connected to the other input node of the logic circuit 212. The output node of the logic circuit 212 is connected to a control node of the second comparator 220.

Figure 3:
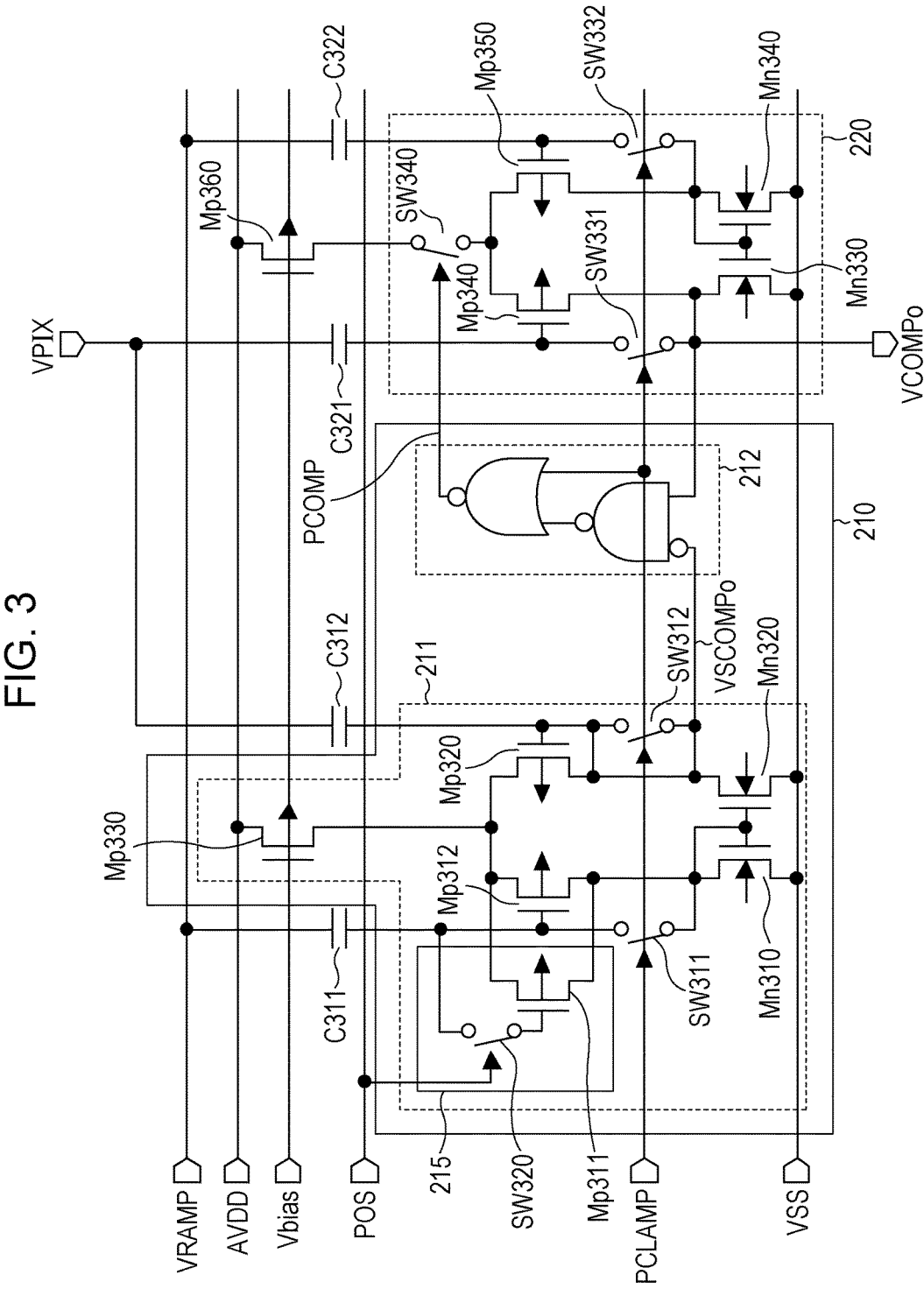
FIG. 3 is a diagram illustrating the details of the configuration of the comparison circuit unit and the operation of switches.

FIG. 3 is a diagram illustrating the details of the configuration of the comparison circuit unit 106. The same members in FIG. 3 as those illustrated in FIG. 2 are denoted by the same reference signs in FIG. 2.

The first comparator 211 includes a transistor Mp312 and a transistor Mp320 which constitute a differential input stage. The first comparator 211 further includes a switch SW311 and a switch SW312. One node of the switch SW311 is connected to the capacitive element C311, and the other node is connected to a connection node between a transistor Mn310 and a transistor Mp312. One node of the switch SW312 is connected to the capacitive element C312, and the other node is connected to a connection node between a transistor Mn320 and the transistor Mp320.

The first comparator 211 includes the transistor Mn310 and the transistor Mn320 which form a current mirror circuit. The transistor Mp312, the transistor Mp320, the transistor Mn310, and the transistor Mn320 form a first differential pair.

The offset imparting unit 215 includes a switch SW320 and a transistor Mp311. When the switch SW320 is in a non-conducting state, one input stage of the first differential pair includes only one transistor Mp312. When the switch SW320 is in a conducting state, one input stage of the first differential pair includes the transistor Mp311 and the transistor Mp312. Thus, by controlling the conduction and non-conduction of the switch SW320, the gate width W of one input stage of the first differential pair can be changed. One input stage of the first differential pair receives the signal VRAMP via the capacitive element C311. The gate of the transistor Mp320, which is the other input stage of the first differential pair, receives a signal VPIX through the signal line 208 via the capacitive element C312. The signal VPIX is a pixel signal that the pixel 201 outputs.

The first differential pair further includes a transistor Mp330, which is a current source.

The second comparator 220 includes a transistor Mp340 and a transistor Mp350, which form a differential input stage. The second comparator 220 further includes a switch SW331 and a switch SW332. One node of the switch SW331 is connected to the capacitive element C321, and the other node is connected to a connection node between a transistor Mn330 and a transistor Mp340. One node of the switch SW332 is connected to the capacitive element C322, and the other node is connected to a connection node between a transistor Mn340 and the transistor Mp350.

The second comparator 220 includes the transistor Mn330 and the transistor Mn340 which form a current mirror circuit. The transistor Mp340, the transistor Mp350, the transistor Mn330, and the transistor Mn340 form a second differential pair.

The gate of the transistor Mn340, which is one input stage of the second differential pair, receives the signal VRAMP via the capacitive element C321. The gate of the transistor Mp350, which is the other input stage of the second differential pair, receives the signal VPIX through the signal line 208 via the capacitive element C322.

The second comparator 220 further includes a transistor Mp360 which is a current source. The second comparator 220 further includes a switch SW340 in an electrical path between the transistor Mp360 and a connection node between the transistor Mp340 and the transistor Mp350. The switch SW340 is controlled by the output of the logic circuit 212.

The switch SW320 is controlled by a signal POS supplied from a timing generator (not shown).

The switch SW311, the switch SW312, the switch SW331, and the switch SW332 are controlled by a signal PCLAMP supplied from a timing generator (not shown).

The transistor Mp330 and the transistor Mp360 is supplied with a voltage VBias from a voltage supply unit (not shown).

The amount of current to be supplied from the transistor Mp330 is set to be smaller than the amount of current to be supplied from the transistor Mp360. For example, the gate size of the transistor Mp330 is set to be smaller than that of the transistor Mp360. As a result, the current consumption of the first comparator 211 is lower than the current consumption of the second comparator 220.

The switches illustrated in FIG. 3 excluding the switch SW340 are in a conducting state when input control signals are at high level and in a non-conducting state when input control signals are at low level. The switch SW340 is in a conducting state when an input control signal is at high level, and in a non-conducting state when an input control signal is at low level.

Next, the operation of the image capturing apparatus including the comparison circuit unit 106 in FIG. 3 will be described mainly with reference to FIG. 4. The signals shown in FIG. 4 correspond to the signals shown in FIG. 2 and FIG. 3.

By time t1, the vertical scanning circuit 102 changes the signal PRES from High level (hereinafter referred to as Hi level) which is an active level to low level (hereinafter referred to as Lo level) which is a non-active level. As a result, reset of the node 204 is canceled. The vertical scanning circuit 102 also changes the signal PSEL to be input to pixels 201 in a given row from Lo level to Hi level. As a result, the selection switches 207 of the pixels 201 in a row to which the signal PSEL at Hi level is input (hereinafter referred to as a selected row) enter a conducting state. As a result, each of the amplifying transistors 206 of the pixels 201 in the selected row outputs a signal based on the potential of the node 204 in which reset is canceled to the signal line 208. This signal is a noise signal whose main component is the noise component of the pixel 201. This noise signal is expressed as N signal.

At time t1, the timing generator (not shown) changes the signal PCLAMP from Lo level to Hi level. The ramp-signal supply unit 104 offsets the signal VRAMP to a predetermined potential.

At time t5, the timing generator changes the signal PCLAMP from Hi level to Lo level. As a result, the capacitive element C312 and the capacitive element C322 individually clamp the N signal. The capacitive element C311 and the capacitive element C321 individually clamp the signal VRAMP whose potential is offset.

In the reset period, a signal PCOMP goes Lo level which is the active level of the switch SW340. As a result, the second comparator 220 is in an operating state during the reset period.

The period from time t1 to time t5 is a reset period during which the comparison circuit unit 106 is reset. During the reset period, the switch SW340 is in the conducting state. Accordingly, the second differential pair of the second comparator 220 is in an operating state.

After the capacitive element C311 and the capacitive element C321 clamp the offset signal VRAMP at time t5, the potential of the signal VRAMP is reset.

Thereafter, the timing generator changes the signal POS from Lo level to Hi level. As a result, the signal VRAMP to be input to the first comparator 211 goes to a signal level effectively shifted in a direction in which the potential changes with the lapse of time from the signal VRAMP output from the ramp-signal supply unit 104.

During the period from time t5 to time t15, described later, the signal PCOMP is at Hi level which is the non-active level. As a result, the second differential pair of the second comparator 220 is in a non-operating state.

At time t10, the ramp-signal supply unit 104 changes the potential of the signal VRAMP with the lapse of time. The signal whose potential changes with the lapse of time is a ramp signal. The counter 105 starts to count a clock signal (not shown). By doing this, a count signal indicating an elapsed time since the change in the potential of the signal VRAMP with the lapse of time is started is output from the counter 105 to the memories 107 of the individual columns. The current consumption per unit time of the second comparator 220 at t10 is first current consumption.

In this specification, the amount of current and power consumed by each comparison circuit unit 106 will be described using current consumption per unit time and power consumption. The power consumption is current consumption per unit time multiplied by time. For example, the power consumption of the comparison circuit unit 106 during the analog-to-digital conversion period is the amount of current consumption per unit time integrated in the analog-to-digital conversion period.

At time t15, the magnitude relationship between the potentials of the shifted signal VRAMP and the N signal compared by the first comparator 211 changes. As a result, a signal VSCOMPo (first comparison result signal) which is the output of the first comparator 211 changes from Hi level to Lo level. As a result, the signal PCOMP changes from Hi level, which is the non-active level, to Lo level, which is the active level. As a result, the second differential pair of the second comparator 220 changes from a non-operating state to an operating state. As a result, the second comparator 220 starts to compare the signal VRAMP and the N signal. The current consumption per unit time of the second comparator 220 at time t15 is second current consumption higher than the first current consumption.

At time t20, the magnitude relationship between the potentials of the signal VRAMP and the N signal changes. As a result, a second comparison result signal VCOMPo, which is the output of the second comparator 220, changes from Hi level to Lo level. The memory 107 of each column holds a count signal based on a timing at which the signal VCOMPo of the second comparator 220 corresponding thereto changes from Hi level to Lo level. The count signal held by the memory 107 of each column is a digital signal based on the N signal.

Since the signal level of the signal VCOMPo changes at time t20, the signal PCOMP changes from Lo level, which is the active level, to Hi level, which is the non-active level. As a result, the second differential pair of the second comparator 220 changes from the operating state to the non-operating state. The current consumption per unit time of the second comparator 220 at time t20 is fourth current consumption lower than the second current consumption. The fourth current consumption may be set to be the same as the first current consumption.

At time t25, the ramp-signal supply unit 104 terminates the change in the potential of the signal VRAMP with the lapse of time.

The period from time t10 to time t25 is an N-AD period, which is an analog-to-digital conversion period for converting N signals to digital signals.

A period during which the second comparator 220 operates in the N-AD period is the period from time t15 to time t20. During the other period, the first comparator 211 whose current consumption is lower than that of the second comparator 220 is operating. For that reason, the current consumption of the first comparator 211 and the second comparator 220 during the N-AD period is lower than a case in which the first comparator 211 does not operate and the second comparator 220 is continuously operating during the N-AD period.

The first comparator 211 may only have comparison accuracy sufficient to switch the second differential pair of the second comparator 220 from the non-operating state to the operating state. In other words, the first differential pair of the first comparator 211 may have lower comparison accuracy than that of the second differential pair of the second comparator 220 involved in generation of digital signals based on the N signals. Accordingly, even if the current consumption per unit time of the first differential pair of the first comparator 211 is set to third current consumption lower than the second current consumption of the second differential pair of the second comparator 220, the analog-to-digital conversion accuracy of the N signals is not likely to decrease.

Thereafter, the vertical scanning circuit 102 changes the signal PTX to be output to pixels 201 in a selected row from Lo level to Hi level and again to Lo level.

As a result, electric charge generated in the photodiode 202 is transferred to the node 204. The amplifying transistor 206 outputs a signal based on the potential of the node 204 to which the electric charge generated by the photodiode 202 is transferred to the signal line 208. This signal is expressed as S signal.

At time t30, the ramp-signal supply unit 104 starts to change the potential of the signal VRAMP with the lapse of time. At time t30, the signal PCOMP is at Hi level, which is the non-active level, and therefore the second differential pair of the second comparator 220 is in the non-operating state. The first comparator 211 compares the shifted signal VRAMP with the S signal. The counter 105 starts to generate a count signal as in the N-AD period, in response to the start of the change in the potential of the signal VRAMP.

At time t35, the magnitude relationship between the shifted potential VRAMP and the S signal, which are compared by the first comparator 211, changes. As a result, the signal level of the signal VSCOMPo changes. Thus, the signal PCOMP changes from Hi level, which is the non-active level, to Lo level, which is the active level. As a result, the second differential pair of the second comparator 220 changes from the non-operating state to the operating state. As a result, the second comparator 220 starts to compare the signal VRAMP and the S signal.

At time t40, the magnitude relationship between the potentials of the signal VRAMP and the S signal changes. As a result, the signal VCOMPo, which is the output of the second comparator 220, changes from Hi level to Lo level.

The memory 107 of each column holds a count signal based on a timing at which the signal VCOMPo of the second comparator 220 changes from Hi level to Lo level. The count signal held by the memory 107 of each column is a digital signal based on the S signal.

Since the signal level of the signal VCOMPo changes at time t40, the signal PCOMP changes from Lo level, which is the active level, to Hi level, which is the non-active level. As a result, the second differential pair of the second comparator 220 changes from the operating state to the non-operating state.

At time t45, the ramp-signal supply unit 104 terminates the change in the potential of the signal VRAMP with the lapse of time.

The period from time t30 to time t45 is an S-AD period, which is an analog-to-digital conversion period for converting the S signal to a digital signal.

A period during which the second comparator 220 operates in the S-AD period is the period from time t35 to time t40. During the other period, the first comparator 211 whose current consumption is lower than that of the second comparator 220 is operating. For that reason, the current consumption of the first comparator 211 and the second comparator 220 during the S-AD period is lower than a case in which the first comparator 211 does not operated and the second comparator 220 is continuously operating during the S-AD period.

The first comparator 211 may only have sufficient comparison accuracy to switch the second differential pair of the second comparator 220 from the non-operating state to the operating state. In other words, the first differential pair of the first comparator 211 may have lower comparison accuracy than that of the second differential pair of the second comparator 220 involving in generation of digital signals based on the S signals. Accordingly, even if the current consumption of the first differential pair of the first comparator 211 is made lower than that of the second differential pair of the second comparator 220, the analog-to-digital conversion accuracy of the S signal is not likely to decrease.

Thus, the image capturing apparatus of the present embodiment performs control of operation and non-operation of the second differential pair of the second comparator that outputs comparison result signals for use in generating digital signals corresponding to analog signals by using the comparison result signals of the first differential pair whose current consumption is lower than that of the second differential pair. This reduces the current consumption per unit time of the comparison circuit unit 106 during the analog-to-digital conversion period.

In the present embodiment, no current is supplied to the second comparator 220 in the non-operating state. This is not intended to limit the present disclosure. The current consumption in the non-operating state is lower than the current consumption in the operating state. Also in the non-operating state, fast transition from the non-operating state to the operating state can be achieved by supplying current lower than that in the operating state to the second comparator 220.

Furthermore, in the present embodiment, a period during which the second comparator 220 is in the non-operating state is provided in both of the N-AD period and the S-AD period. This is not intended to limit the present disclosure. The period during which the second comparator 220 is in the non-operating state may be provided in either one of the N-AD period and the S-AD period.

Another example will be described. Over the entire N-AD period, the second comparator 220 is kept in the operating state, and the first comparator 211 is kept in the non-operating state. In the S-AD period, the first comparator 211 may be brought into the operating state, and the second comparator 220 may be brought into the operating state in accordance with a change in the signal level of the first comparison result signal, as described in the present embodiment. The N-AD period is shorter than the S-AD period. For that reason, the effect of reducing the power consumption by bringing the second comparator 220 into the non-operating state during the analog-to-digital conversion period is smaller during the N-AD period than during the S-AD period.

Alternatively, whether to provide a period during which the second comparator 220 is kept in the non-operating state in the S-AD period may be switched depending on the amplitude of the S signal. For example, the comparison circuit unit 106 compares the S signal and a predetermined amplitude prior to the S-AD period. If the result of comparison shows that the amplitude of the S signal is larger than the predetermined amplitude, a period in which the second comparator 220 is kept in the non-operating state is provided in the S-AD period. In contrast, if the result of comparison shows that the amplitude of the S signal is smaller than the predetermined amplitude, the period in which the second comparator 220 is kept in the non-operating state is not provided in the S-AD period, so that the second comparator 220 is kept in the operating state over the entire S-AD period. Alternatively, during the S-AD period, the first comparator 211 is kept in the non-operating state, and the second comparator 220 is kept in the operating state from the start of the S-AD period, and after the signal level of the second comparison result signal changes, the second comparator 220 may be brought into the non-operating state.

The column circuit 103 may further include an amplifying circuit that amplifies the S signal at the previous stage of the comparison circuit unit 106. In a case where the column circuit 103 includes the amplifying circuit, the amplifying circuit outputs a signal as the pixel signal, by amplifying a signal output from the pixel.

The image capturing apparatus of the present embodiment includes the amplifying transistor 206, the transistor Mp320, which is the other input stage of the first differential pair, and the transistor Mp340, which is the other input stage of the second differential pair. In another example, the amplifying transistor 206 may serve as both of the other input stage of the first differential pair and the other input stage of the second differential pair, as illustrated in FIG. 5.

Figure 5:
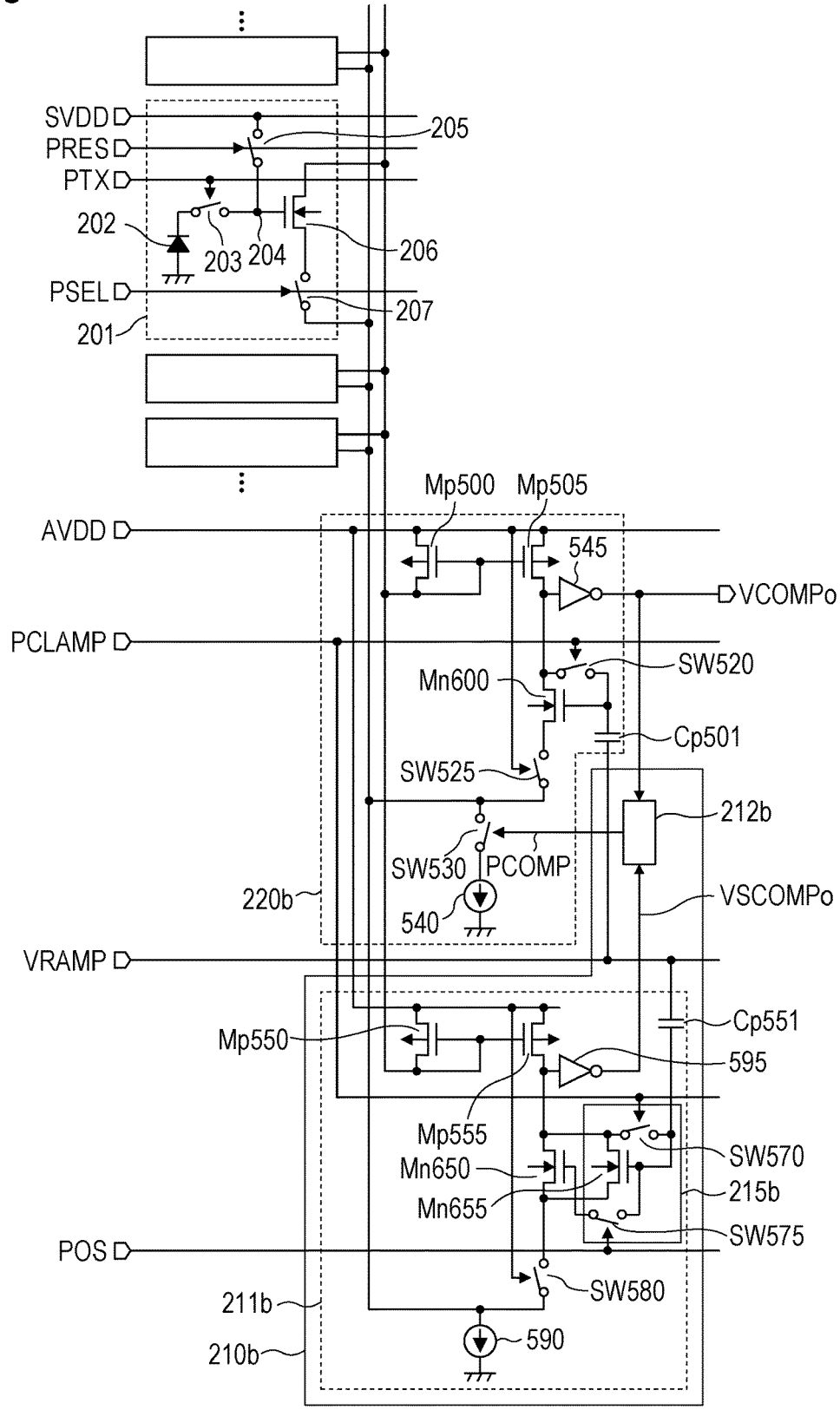
FIG. 5 is a diagram of an image capturing apparatus including a comparison control circuit and a second comparator.

FIG. 5 is a diagram of an image capturing apparatus including a comparison control circuit 210b and a second comparator 220b. The comparison control circuit 210b includes a first comparator 211b and an offset imparting unit 215b.

The offset imparting unit 215b includes a transistor Mn655, a switch SW570, and a switch SW575.

The first comparator 211b includes a transistor Mp550 and a transistor Mp555 which form a current mirror circuit. The first comparator 211b further includes a transistor Mn650 as one input stage of the first differential pair. The offset imparting unit 215b can switch one input stage of the first differential pair between only the transistor Mn650 and both of the transistor Mn650 and the transistor Mn655 connected in parallel. The other input stage of the first differential pair is a MOS transistor, that is, the amplifying transistor 206 in the present embodiment, whose gate receives the electric charge of the photodiode 202.

The first comparator 211b further includes a capacitive element Cp551, an inverter 595, a switch SW580, and a current source 590. The output of the inverter 595 is the signal VSCOMPo, which is the first comparison result signal output from the first comparator 211b. The first comparison result signal is input to a logic circuit 212b.

The second comparator 220b includes a transistor Mp500 and a transistor Mp505 that form a current mirror circuit. The second comparator 220b further includes a transistor Mn600 as one input stage of the second differential pair. The other input stage of the second differential pair is the amplifying transistor 206.

The second comparator 220b further includes a capacitive element Cp501, an inverter 545, a switch SW520, a switch SW525, a switch SW530, and a current source 540. The output of the inverter 545 is the signal VCOMPo, which is the second comparison result signal output from the second comparator 220b.

The logic circuit 212b controls the switch SW530 using the signal PCOMP. A method for control therefor can be the method described in the present embodiment.

In the present embodiment, the ramp signal is offset because the first comparison result signal changes in signal level earlier than the second comparison result signal. This is not intended to limit the present disclosure. Pixel signals may be offset. In this case, the pixel signals may be offset so as to decrease in amplitude. Furthermore, in the present embodiment, the offset is performed in the input stage of the differential pair. This is not intended to limit the present disclosure. Alternatively, the current mirror circuit of the differential pair may be offset. As a further alternative, both of the input stage of the differential pair and the current mirror circuit may be offset. As a still further alternative, in a case where the inclination of the signal VRAMP is variable, the magnitude of the offset to be imparted to the first comparator 211 may be changed depending on the inclination of the signal VRAMP.

In the present embodiment, signals to be input to the first comparator 211 are offset. However, in the present embodiment, the first comparison result signal changes in signal level earlier than the second comparison result signal. In other words, a signal to be input to the second comparator 220 may be offset so that the second comparison result signal changes in signal level later than the first comparison result signal. In this case, a correction process for subtracting the imparted offset from the digital signal may be performed by the DFE 130.

In the image capturing apparatus of the present embodiment, the second comparator is kept in the non-operating state during the period from the start of the analog-to-digital conversion period until the signal level of the first comparison result signal changes. The second comparator enters the operating state in correspondence with the change in the signal level of the first comparison result signal to perform second comparison. In the image capturing apparatus of the present embodiment, the current consumption per unit time of the first comparison is lower than the current consumption per unit time of the second comparison. This reduces the current consumption of the comparison circuit unit 106 during the analog-to-digital conversion period regardless of the scene of image capture.

In the technique of Patent Literature 1, the comparator includes a differential pair and an output stage, and the differential pair that performs comparison is supplied with current over the entire analog-to-digital conversion period. Therefore, the power consumption of the comparator during the analog-to-digital conversion period is not sufficiently reduced. The image capturing apparatus of the present embodiment includes the first comparator and the second comparator, and the current consumption per unit time of first comparison using the first comparator is lower than that of second comparison using the second comparator. Thus, in the image capturing apparatus of the present embodiment, the power consumption of the comparison circuit unit during the period from the start of the analog-to-digital conversion period until the signal level of the first comparison result signal changes can be reduced.

Furthermore, the image capturing apparatus of the present embodiment controls the operation of the second differential pair using the output of the first differential pair whose current consumption per unit time is lower than that of the second differential pair. Specifically, in the present embodiment, the second differential pair is kept in the non-operating state during the period from the start of the analog-to-digital conversion period until the signal level of the first comparison result signal changes. Furthermore, the current consumption per unit time of the first differential pair during the period from the start of the analog-to-digital conversion period until the signal level of the first comparison result signal changes is set to be lower than the current consumption per unit time of the second differential pair in the operating state. Thus, the image capturing apparatus of the present embodiment reduces the power consumption of the differential pair as compared with the technique of Patent Literature 1. As a result, the power consumption of the comparison circuit unit during the analog-to-digital conversion period can be reduced.

In the image capturing apparatus of the present embodiment, each of the plurality of column circuits 103 includes the offset imparting unit 215. In another example, the following reference configuration may be provided, instead of omitting the offset imparting unit 215. The ramp-signal supply unit 104 supplies a first ramp signal to a first comparator of each of the plurality of column circuits 103. The ramp-signal supply unit 104 supplies a second ramp signal having an offset imparted to the first ramp signal to each of second comparators of the plurality of column circuits 103. However, in this example, the ramp-signal supply unit 104 generates a plurality of ramp signal, so that the current consumption of the ramp-signal supply unit 104 increases. Furthermore, wiring to transmit the first ramp signal and wiring to transmit the second ramp signal are performed, so that the circuit area of the wiring for the ramp signals increases. In contrast, in the image capturing apparatus of the present embodiment, each of the plurality of column circuits 103 includes the offset imparting unit 215, so that the ramp signal that the ramp-signal supply unit 104 supplies to the first comparator and the second comparator can be the same signal. Thus, the increase in the current consumption of the ramp-signal supply unit 104 with the reference configuration does not occur in the image capturing apparatus of the present embodiment. Furthermore, the image capturing apparatus of the present embodiment can decrease in the number of wiring lines for transmitting ramp signals as compared with the above reference configuration.

Second Embodiment

An image capturing apparatus according to a second embodiment will be described focusing on differences from the first embodiment.

The second embodiment differs from the first embodiment in the configuration of the logic circuit 212 that controls the second comparator 220. The other configuration is the same as the configuration in FIG. 2 described in the first embodiment.

In the first embodiment, the second comparator 220 has a non-operating period in part of the analog-to-digital conversion period. In the present embodiment, the first comparator 211 also has a non-operating period in the analog-to-digital conversion period.

Figure 6:
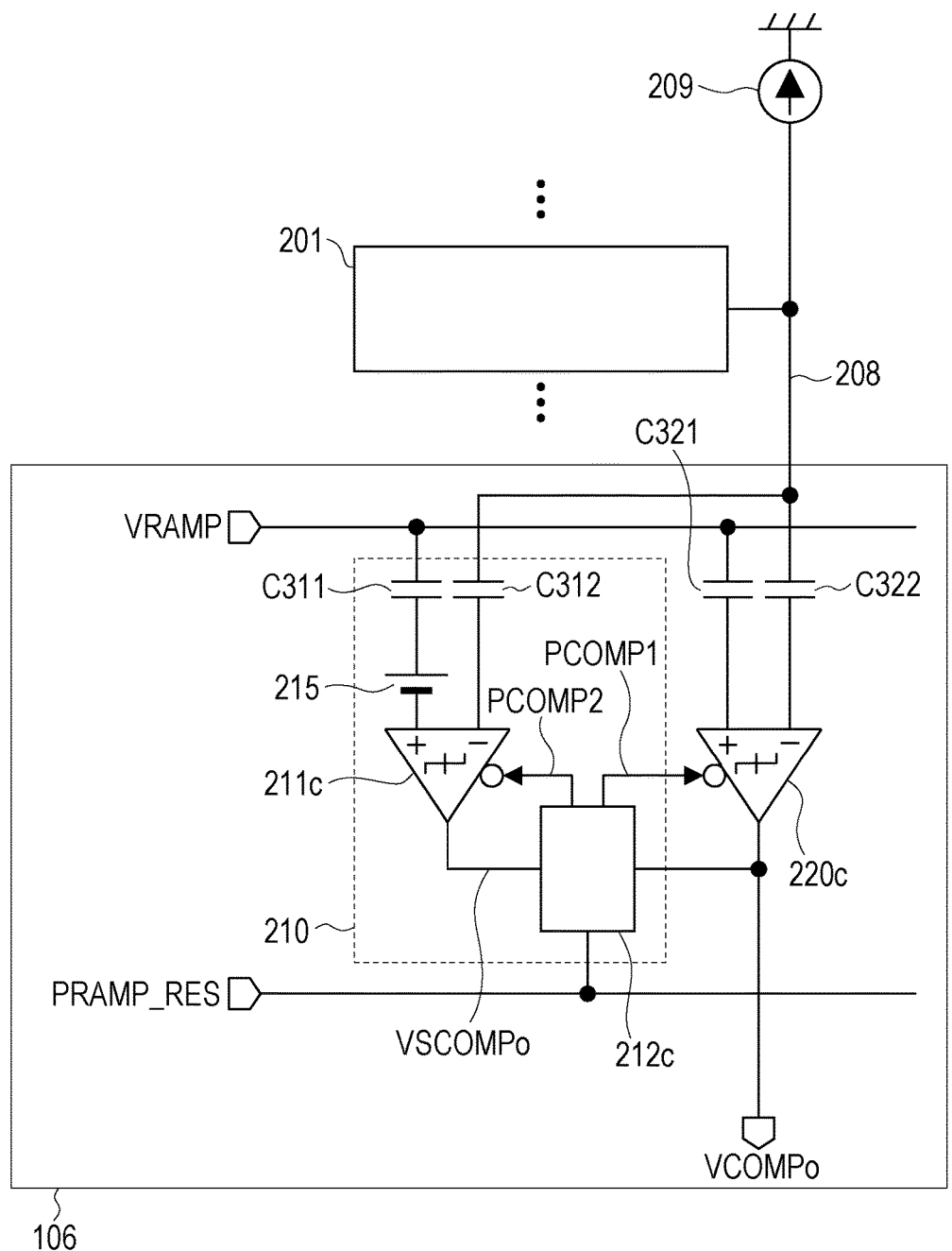
FIG. 6 is a diagram illustrating the configuration of an image capturing apparatus of a second embodiment.

FIG. 6 is a diagram illustrating the configuration of the image capturing apparatus of the present embodiment. A column circuit 103 of the present embodiment includes a first comparator 211c, a logic circuit 212c, and a second comparator 220c. A signal VSCOMPo, which is the output of the first comparator 211, is input to the logic circuit 212c. A signal PCOMP1, which is the output of the logic circuit 212c, is input to the second comparator 220c. A signal VCOMPo, which is the output of the second comparator 220c, is input to the logic circuit 212c. A signal PRAMP_RES is also input to the logic circuit 212c. A signal PCOMP2, which is the output of the logic circuit 212c, is input to the first comparator 211c.

The first comparator 211c has a configuration in which a switch for controlling current flowing to the first comparator 211c is added to the first comparator 211 shown in FIG. 3. This switch may be disposed in an electrical path between a connection node between the transistor Mp312 and the transistor Mp320 and the transistor Mp330 which is a current source. This switch goes to a conducting state when the signal PCOMP2 is at Lo level and goes to a non-conducting state when the signal PCOMP2 is at Hi level.

The configuration of the second comparator 220c can be the same as the configuration of the second comparator 220 illustrated in FIG. 3. In the present embodiment, the switch SW340 is controlled by the signal PCOMP1.

Figure 7:
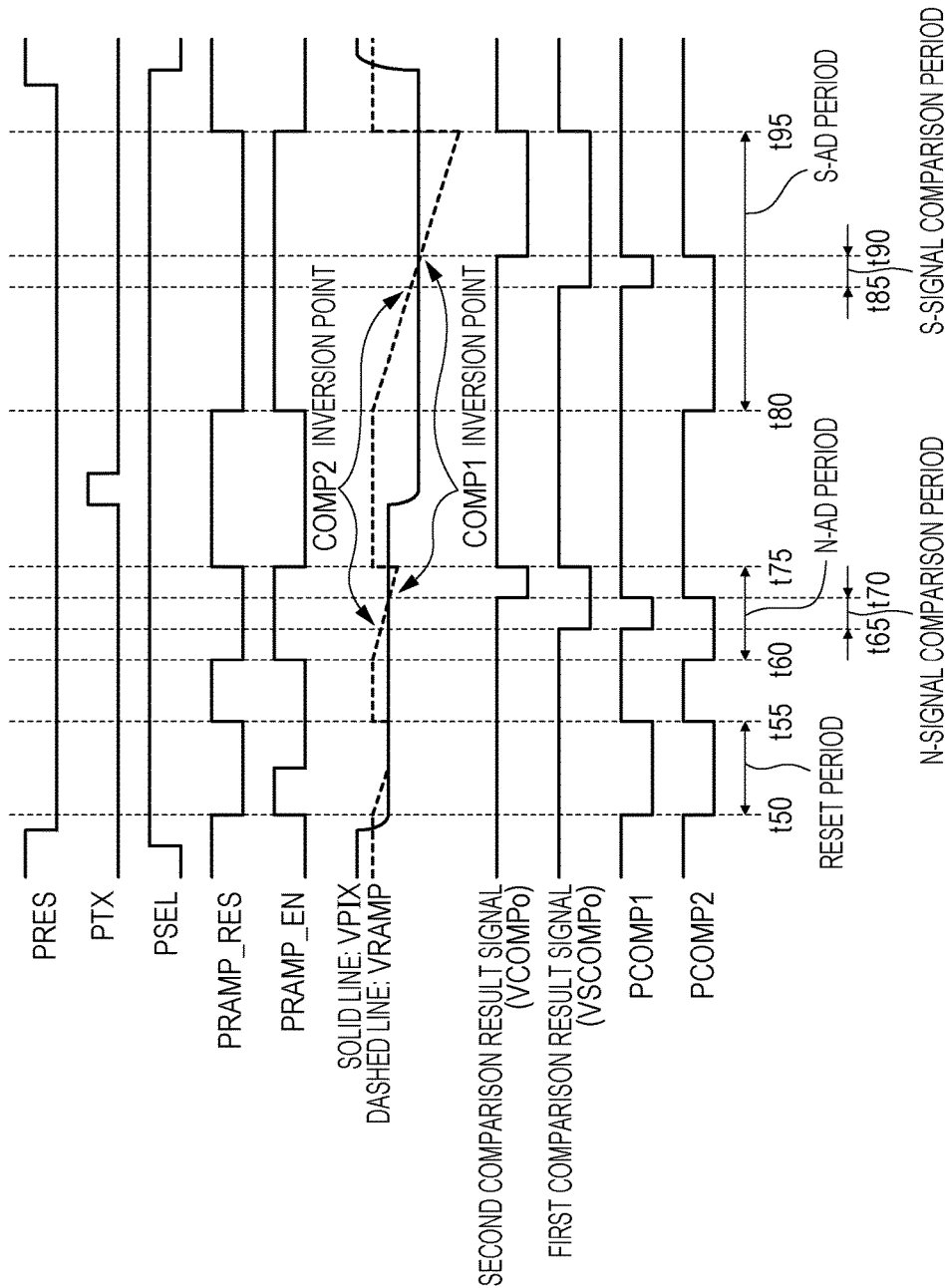
FIG. 7 is a diagram illustrating the operation of the image capturing apparatus illustrated in FIG. 6.

FIG. 7 is a diagram illustrating the operation of the image capturing apparatus illustrated in FIG. 6. The signals illustrated in FIG. 7 correspond to the signals illustrated in FIG. 6.

Figure 4:
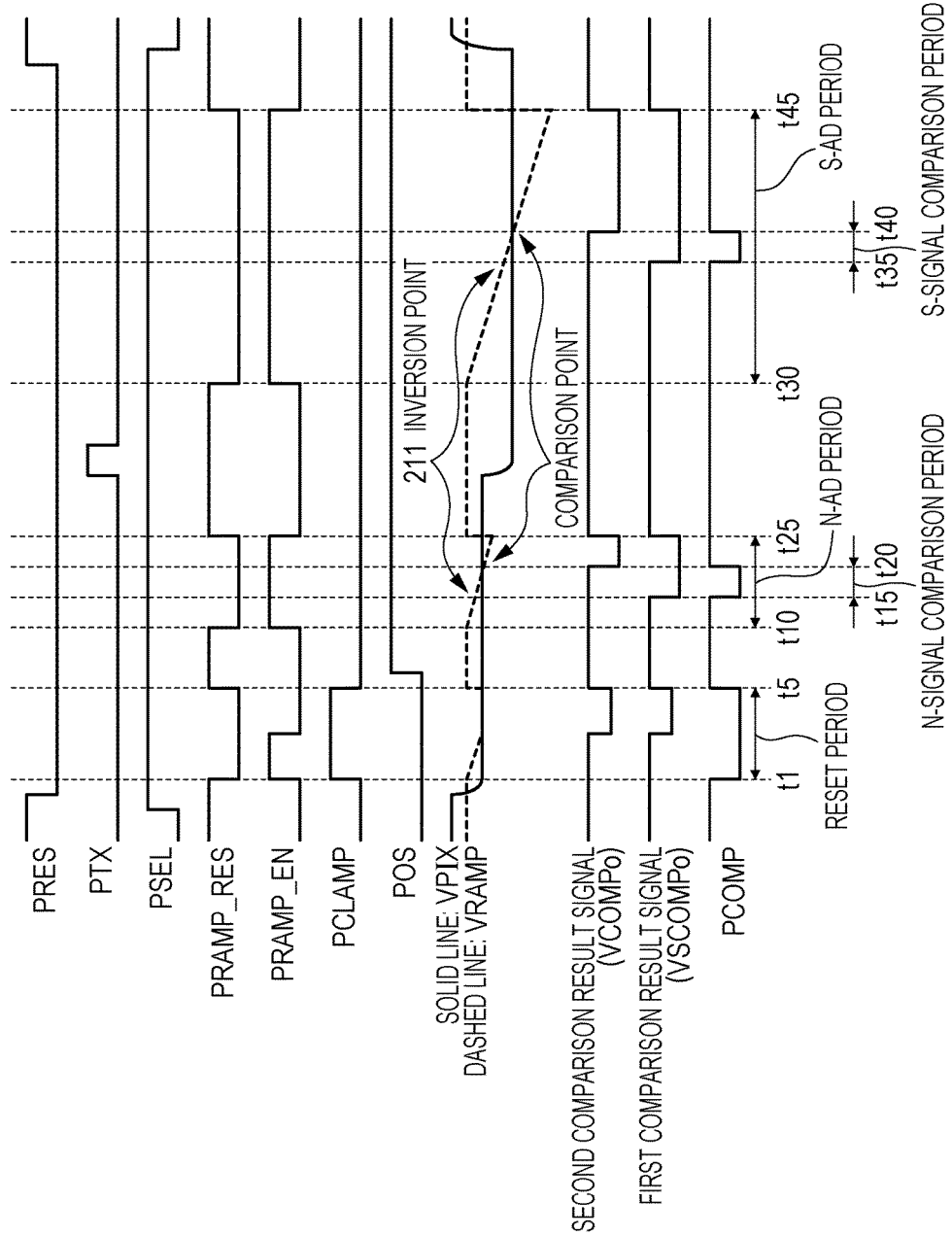
FIG. 4 is a diagram illustrating the operation of the image capturing apparatus including the comparison circuit unit.

The operation during the period from time t50 to time t60 is the same as the operation from time t1 to time t10 in FIG. 4.

At time t60, the ramp-signal supply unit 104 changes the potential of the signal VRAMP with the lapse of time. The counter 105 starts to count a clock signal (not shown). By doing this, a count signal indicating an elapsed time since the change in the potential of the signal VRAMP with the lapse of time is started is output from the counter 105 to the memories 107 of the individual columns. Since the signal PCOMP1 is at Hi level which is the non-active level, the second comparator 220c is in the non-operating state.

In response to that the signal PRAMP_RES changes from Hi level to Lo level, the signal PCOMP2 changes from Hi level which is the non-active level to Lo level which is the active level. As a result, the first comparator 211c changes from the non-operating state to the operating state. As a result, the first comparator 211c compares the signal VRAMP shifted from the signal VRAMP and the N signal.

At time t65, the magnitude relationship between the potentials of the shifted signal VRAMP and the N signal, which are compared by the first comparator 211c, changes. As a result, the first comparison result signal, which is the output of the first comparator 211c, changes from Hi level to Lo level. As a result, the signal PCOMP1 changes from Hi level, which is the non-active level, to Lo level which is the active level. As a result, the second comparator 220c changes from the non-operating state to the operating state.

As a result, the second comparator 220c starts to compare the signal VRAMP and the N signal.

At time t70, the magnitude relationship between the potentials of the signal VRAMP and the N signal changes. As a result, the second comparison result signal VCOMPo, which is the output of the second comparator 220c, changes from Hi level to Lo level. The memory 107 of each column holds a count signal based on the timing at which the signal VCOMPo of the second comparator 220c changes from Hi level to Lo level. The count signal held in the memory 107 of each column is a digital signal based on the N signal.

Since the signal level of the signal VCOMPo changes at time t70, the signal PCOMP1 and the signal PCOMP2 change from Lo level which is the active level to Hi level which is the non-active level. As a result, the first comparator 211c and the second comparator 220c change from the operating state to the non-operating state.

At time t75, the ramp-signal supply unit 104 terminates the change in the potential of the signal VRAMP with the lapse of time.

A period during which the first comparator 211c is in the operating state in the N-AD period from time t60 to time t75 is from time t60 to time t70. A period during which the second comparator 220c is in the operating state is from time t65 to time t70.

At time t80, the ramp-signal supply unit 104 attain starts to change the potential of the signal VRAMP with the lapse of time. Since at time t80 the signal PCOMP1 is at Hi level which is the non-active level, the second comparator 220c is in the non-operating state. The counter 105 starts to generate a count signal, as during the N-AD period, upon the start of the change in the potential of the signal VRAMP.

In response to that the signal PRAMP_RES changes from Hi level to Lo level, the signal PCOMP2 changes from Hi level which is the non-active level to Lo level which is the active level. As a result, the first comparator 211c changes from the non-operating state to the operating state. As a result, the first comparator 211c compares the signal VRAMP shifted from the signal VRAMP and the N signal.

At time t85, the magnitude relationship between the shifted potential VRAMP and the S signal compared by the first comparator 211c changes. As a result, the signal PCOMP1 changes from Hi level which is the non-active level to Lo level which is the active level. As a result, the second comparator 220c changes from the non-operating state to the operating state. As a result, the second comparator 220c starts to compare the signal VRAMP and the S signal.

At time t90, the magnitude relationship between the potentials of the signal VRAMP and the S signal changes. As a result, the signal VCOMPo, which is the output of the second comparator 220c, changes from Hi level to Lo level. The memory 107 in each column holds a count signal based on the timing at which the signal VCOMPo of the corresponding second comparator 220c changes from Hi level to Lo level. The count signal held by the memory 107 in each column is a digital signal based on the S signal.

Since the signal level of the signal VCOMPo changes at time t90, the signal PCOMP2 changes from Lo level which is the active level to Hi level which is the non-active level. As a result, the second comparator 220c changes from the operating state to the non-operating state.

Since the signal level of the signal VCOMPo changes, the signal PCOMP1 also changes from Lo level which is the active level to Hi level which is the non-active level. As a result, the first comparator 211c also changes from the operating state to the non-operating state.

At time t95, the ramp-signal supply unit 104 terminates the change in the potential of the signal VRAMP with the lapse of time.

A period during which the first comparator 211c is in the operating state in the S-AD period from time t80 to time t95 is from time t80 to time t90. A period during which the second comparator 220c is the operating state is from time t85 to time t90.

The image capturing apparatus of the present embodiment holds the first comparator 211c in the operating state during the period from the start of the analog-to-digital conversion period until the signal level of the second comparison signal changes. In the other period, the image capturing apparatus of the present embodiment holds the first comparator 211c in the non-operating state. Furthermore, the image capturing apparatus of the present embodiment holds the second comparator 220c in the operating state during a period after the signal level of the first comparison result signal changes until the signal level of the second comparison result signal changes.

The image capturing apparatus of the present embodiment holds also the first comparator 211c in the operating state during only part of the analog-to-digital conversion period. This reduces the power consumption of the first comparator 211c during the analog-to-digital conversion period.

Third Embodiment

An image capturing apparatus according to a third embodiment will be described focusing on differences from the second embodiment.

In the image capturing apparatus of the second embodiment, the column circuit 103 of each column includes the first comparator 211c and the second comparator 220c. In the third embodiment, a single comparator is provided for pixels 201 of one column.

The image capturing apparatus of the present embodiment performs a first operation and a second operation. The first operation is an operation for a case in which pixel signals are read from the pixels 201 of a plurality of columns. In the first operation, the comparator of each column compares pixel signals of corresponding column and ramp signals to each other. The second operation is an operation for a case in which pixel signals of only part of a plurality of columns are read from the pixel 201 and in which pixel signals of the other part of the columns are not read from the pixel 201. In the second operation, the comparators of the part of the columns operate as first comparators, and the comparators of the other part of the columns operate as second comparators. The image capturing apparatus of the present embodiment can select the first operation or the second operation from a plurality of operations including operations other than the first operation and the second operation.

FIG. 8A is a diagram illustrating the configuration of a column circuit 103 of the present embodiment.

The column circuit 103 includes a signal switching unit 801 and a comparison circuit unit 106. The signal switching unit 801 switches a signal to be input to a comparator 250(m) to either of a pixel signal VPIX(m) which is a pixel signal VPIX in the mth-column and a pixel signal VPIX(m+1) which is a pixel signal VPIX in the (m+1)th column. The signal switching unit 801 includes a switch SW8010 and a switch SW8011.

The comparison circuit unit 106 includes a comparator 250(m), a comparator 250(m+1), an offset switching unit 802, and a logic circuit 212d.

The offset switching unit 802 includes a switch SW8020 and a switch SW8021.

The logic circuit 212d receives a signal ADD_EN from a timing generator (not shown). The signal ADD_EN is a signal for switching between the first operation and the second operation. When the signal ADD_EN is at Lo level, the comparator 250 of each column performs the first operation, and when the signal ADD_EN is at Hi level, the comparator 250 of each column performs the second operation.

The signal ADD_EN is also used to control the current consumption of the comparators 250 of part of the columns in the operating state. In other words, when the signal ADD_EN is at Lo level, the current consumption per unit time of the comparator 250 of all the columns including the comparator 250 of part of the columns in the operating state is the second current consumption. In contrast, when the signal ADD_EN is at Hi level, the current consumption per unit time of the comparator 250 of part of columns in the operating state is the third current consumption lower than the second current consumption. The current consumption per unit time of the comparator 250 of the other part of the columns in the operating state is the second current consumption.

FIG. 8B illustrates the connection state of the switches of the column circuit 103 in the first operation. The switch SW8010 of the signal switching unit 801 is in the non-conducting state, and the switch SW8011 is in the conducting state. The signal switching unit 801 inputs the signals VPIX of the pixels 201 of each column to the comparator 250 of the corresponding column. In the offset switching unit 802, the switch SW8020 is in the non-conducting state, and the switch SW8021 is in the conducting state. As a result, the signal VRAMP is input to the comparator 250(m) without passing through the offset imparting unit 215. The signal ADD_EN is at Lo level.

FIG. 8C illustrates the connection state of the switches of the column circuit 103 in the second operation. The switch SW8010 in the signal switching unit 801 is in the conducting state, and the switch SW8011 is in the non-conducting state. As a result, the signal switching unit 801 inputs the signals VPIX of the pixels 201 of the (m+1)th column to the comparator 250(m) of the mth column and the comparator 250(m+1) of the (m+1)th column. In the offset switching unit 802, the switch SW8020 is in the conducting state, and the switch SW8021 is in the non-conducting state. As a result, the comparator 250(m) receives the signal VRAMP via the offset imparting unit 215. The signal ADD_EN is at Hi level.

The operation of the comparator 250(m) in FIG. 8C is the same as the operation of the first comparator 211c in the second embodiment. The operation of the comparator 250(m+1) is the same as the operation of the second comparator 220c in the second embodiment.

Thus, the image capturing apparatus of the present embodiment can also obtain the same effect as that of the second embodiment. The image capturing apparatus of the present embodiment has a configuration in which one comparator 250 is provided for one column of pixels 201. This allows the circuit area of the comparison circuit unit 106 to be smaller than that of the first embodiment and the second embodiment in which a plurality of comparators are provided for one column of pixels 201.

In the present embodiment, operation switching for two columns has been described, but it is applicable to a plurality of columns of three or more.

The present embodiment shows an example in which, in the second operation, the comparator 250(m) of the mth column operates as the first comparator, and the comparator 250(m+1) of the (m+1)th column operates as the second comparator. The present embodiment is given for mere illustration purpose. The first comparator may be the comparator 250(m+1), and the second comparator may be the comparator 250(m).

The present embodiment shows a thinning-out operation of reading pixel signals of only some columns as the second operation. In another example of the second operation, one sum pixel signal may be obtained by summing up pixel signals of a plurality of columns. In this case, both of the switch SW8010 and the switch SW8011 of the signal switching unit 801 in FIG. 8C are brought into the conducting state.

Fourth Embodiment

A fourth embodiment relates to an image capturing system including the image capturing apparatus of one of the above-described embodiments.

Figure 9:
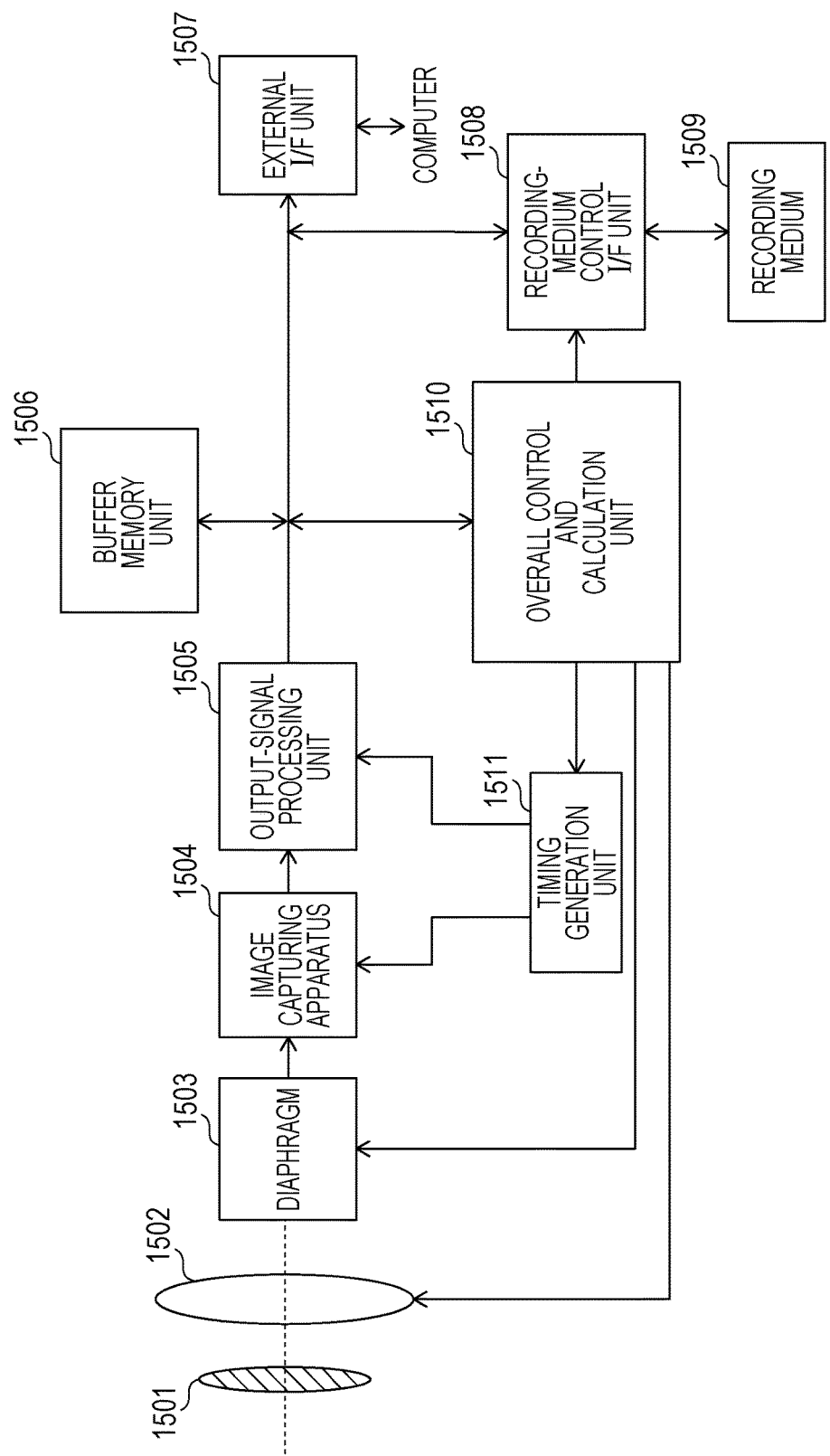
FIG. 9 is a diagram illustrating the configuration of an image capturing system.

Examples of the image capturing system include digital still cameras, digital camcorders, and monitoring cameras. FIG. 9 is a diagram of an example of an image capturing system in which the image capturing apparatus is used in a digital still camera.

The image capturing system illustrated in FIG. 9 includes a barrier 1501 for protecting a lens, a lens 1502 for forming an optical image of an object on an image capturing apparatus 1504, and a diaphragm 1503 for varying the amount of light passing through the lens 1502. The lens 1502 and the diaphragm 1503 constitutes an optical system for collecting light onto the image capturing apparatus 1504. The image capturing system illustrated in FIG. 9 further includes an output-signal processing unit 1505 that processes signals output from the image capturing apparatus 1504. The output-signal processing unit 1505 performs various corrections and compression on the signals as needed and outputs the corrected or compressed signals.

The image capturing system illustrated in FIG. 9 further includes a buffer memory unit 1506 for temporarily storing image data and an external interface unit 1507 for communicating with an external computer or the like. The image capturing system further includes a detachable recording medium 1509, such as a semiconductor memory, in which captured data is recorded or read therefrom, and a recording-medium control interface unit 1508 for use in recording or reading captured data to or from the recording medium 1509. The image capturing system further includes an overall control and calculation unit 1510 that performs various operations and controls the entire image capturing apparatus 1504 and a timing generation unit 1511 that outputs various timing signals to the output-signal processing unit 1505. The timing signals may be input from the outside, so that the image capturing system has only to include at least the image capturing apparatus 1504 and the output-signal processing unit 1505 that processes signals output from the image capturing apparatus 1504.

The output-signal processing unit 1505 is disposed on a second semiconductor substrate separate from a first semiconductor substrate on which the image capturing apparatus 1504 is formed. The first semiconductor substrate and the second semiconductor substrate may be either different chips or a single layered chip.

As described above, the image capturing system of the present embodiment can perform an image capturing operation using the image capturing apparatus 1504.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-089723 filed Apr. 27, 2016, which is hereby incorporated by reference herein in its entirety.

What is claimed is:

1. An image capturing apparatus comprising:
a pixel outputting a pixel signal;
a ramp-signal supplying unit configured to output a ramp signal whose potential changes with a lapse of time; and
an analog-to-digital conversion unit,
wherein the analog-to-digital conversion unit comprises:
a first comparator including input nodes to receive the pixel signal and the ramp signal, and configured to perform first comparison that is comparison between the pixel signal and the ramp signal and to output a first comparison result signal indicating a result of the first comparison;
a second comparator including input nodes to receive the pixel signal and the ramp signal, and configured to perform second comparison that is comparison between the pixel signal and the ramp signal and to output a second comparison result signal indicating a result of the second comparison; and
an offset imparting unit including connected node that is connected to one input node of the input nodes of the first comparator and the second comparator, and configured to impart an offset to at least one of the pixel signal and the ramp signal to be input to either one of the first comparator and the second comparator,
so that the first comparison result signal and the second comparison result signal change in signal level in this order due to the offset during an analog-to-digital conversion period from start of a change in potential of the ramp signal to end of the change,
wherein the second comparator is in a non-operating state during a period from start of the analog-to-digital conversion period until the signal level of the first comparison result signal changes,
wherein the second comparator is set to be an operating state in correspondence with a change in the signal level of the first comparison result signal to perform the second comparison, and
wherein current consumption per unit time of the first comparator during the first comparison is lower than current consumption per unit time the second comparator during of the second comparison.

2. The image capturing apparatus according to claim 1, wherein the first comparator comprises a first differential pair configured to compare the pixel signal and the ramp signal with each other, at least one of the pixel signal and the ramp signal being offset by the offset imparting unit,
wherein the second comparator comprises a second differential pair configured to compare the pixel signal and the ramp signal with each other, wherein current consumption per unit time of the second differential pair during the period from the start of the analog-to-digital conversion period until the signal level of the first comparison result signal changes is a first current consumption,
wherein current consumption per unit time of the second differential pair becomes second current consumption higher than the first current consumption in correspondence with the change in the signal level of the first comparison result signal, and
wherein current consumption per unit time of the first differential pair is third current consumption lower than the second current consumption during the period from the start of the analog-to-digital conversion period until the signal level of the first comparison result signal changes.

3. The image capturing apparatus according to claim 2, wherein the current consumption per unit time of the second differential pair becomes fourth current consumption lower than the second current consumption in correspondence with a change in the signal level of the second comparison result signal.

4. The image capturing apparatus according to claim 3, wherein the first current consumption and the fourth current consumption are equal to each other.

5. The image capturing apparatus according to claim 2, wherein the current consumption per unit time of the first differential pair becomes fifth current consumption lower than the third current assumption in correspondence with a change in the signal level of the second comparison result signal.

6. The image capturing apparatus according to claim 4, wherein the current consumption per unit time of the first differential pair becomes fifth current consumption lower than the third current consumption in correspondence with the change in the signal level of the second comparison result signal.

7. The image capturing apparatus according to claim 2, wherein the pixel signal is a signal corresponding to an amount of light incident on the pixel,
wherein, in a first case in which the pixel signal has an amplitude larger than a predetermined amplitude,
the current consumption per unit time of the second differential pair is the first current consumption during the period from the start of the analog-to-digital conversion period until the signal level of the first comparison result signal changes, and
the current consumption per unit time of the second differential pair becomes the second current consumption higher than the first current consumption in correspondence with the change in the signal level of the first comparison result signal, so that the second differential pair performs the second comparison, and
wherein, in a second case in which the pixel signal has an amplitude smaller than the predetermined amplitude,
the current consumption per unit time of the second differential pair is the second current consumption during a period from the start of the analog-to-digital conversion period until the second comparison result signal changes in signal level, so that the second differential pair performs the second comparison.

8. The image capturing apparatus according to claim 4,
wherein the pixel signal is a signal corresponding to an amount of light incident on the pixel,
wherein, in a first case in which the pixel signal has an amplitude larger than a predetermined amplitude,
the current consumption per unit time of the second differential pair is the first current consumption during the period from the start of the analog-to-digital conversion period until the signal level of the first comparison result signal changes, and
the current consumption per unit time of the second differential pair becomes the second current consumption higher than the first current consumption in correspondence with the change in the signal level of the first comparison result signal, so that the second differential pair performs the second comparison, and
wherein, in a second case in which the pixel signal has an amplitude smaller than the predetermined amplitude,
the current consumption per unit time of the second differential pair is the second current consumption during a period from the start of the analog-to-digital conversion period until the second comparison result signal changes in signal level, so that the second differential pair performs the second comparison.

9. The image capturing apparatus according to claim 6,
wherein the pixel signal is a signal corresponding to an amount of light incident on the pixel,
wherein, in a first case in which the pixel signal has an amplitude larger than a predetermined amplitude,
the current consumption per unit time of the second differential pair is the first current consumption during the period from the start of the analog-to-digital conversion period until the signal level of the first comparison result signal changes, and
the current consumption per unit time of the second differential pair becomes the second current consumption higher than the first current consumption in correspondence with the change in the signal level of the first comparison result signal, so that the second differential pair performs the second comparison, and
wherein, in a second case in which the pixel signal has an amplitude smaller than the predetermined amplitude,
the current consumption per unit time of the second differential pair is the second current consumption during a period from the start of the analog-to-digital conversion period until the second comparison result signal changes in signal level, so that the second differential pair performs the second comparison.

10. The image capturing apparatus according to claim 7, wherein, in the first case, the current consumption per unit time of the second differential pair is brought to fourth current consumption lower than the second current consumption in correspondence with a change in the signal level of the second comparison result signal.

11. The image capturing apparatus according to claim 9, wherein, in the first case, the current consumption per unit time of the second differential pair is brought to fourth current consumption lower than the second current consumption in correspondence with a change in the signal level of the second comparison result signal.

12. The image capturing apparatus according to claim 7, wherein in the first case, the current consumption per unit time of the first differential pair is brought to fifth current consumption lower than the third current consumption in correspondence with a change in the signal level of the second comparison result signal.

13. The image capturing apparatus according to claim 10, wherein, in the first case, the current consumption per unit time of the first differential pair is brought to fifth current consumption lower than the third current consumption in correspondence with the change in the signal level of the second comparison result signal.

14. The image capturing apparatus according to claim 11, wherein, in the first case, the current consumption per unit time of the first differential pair is brought to fifth current consumption lower than the third current consumption in correspondence with the change in the signal level of the second comparison result signal.

15. The image capturing apparatus according to claim 7, wherein, in the second case, the current consumption per unit time of the first differential pair is brought to fifth current consumption lower than the third current consumption over the entire analog-to-digital conversion period.

16. The image capturing apparatus according to claim 14, wherein, in the second case, the current consumption per unit time of the first differential pair is brought to fifth current consumption lower than the third current consumption over the entire analog-to-digital conversion period.

17. The image capturing apparatus according to claim 1, further comprising a plurality of the pixels arrayed in a plurality of columns,
wherein one comparator is disposed in correspondence with a first column of the plurality of columns,
wherein another comparator is disposed in correspondence with a second column of the plurality of column,
wherein the first one comparator and the another comparator are capable of a plurality of operations including a first operation and a second operation,
wherein the first operation is an operation in which the one comparator compares the pixel signal of the first column and the ramp signal with each other, and the another comparator compares the pixel signal of the second column and the ramp signal with each other; and
wherein the second operation is an operation in which the pixel signal of either one of the first column and the second column is input to the one comparator and the another comparator, the one comparator operates as the first comparator, and the another comparator operates as the second comparator.

18. The image capturing apparatus according to claim 16, further comprising a plurality of the pixels arrayed in a plurality of columns,
wherein one comparator is disposed in correspondence with a first column of the plurality of columns,
wherein another comparator is disposed in correspondence with a second column of the plurality of columns,
wherein the one comparator and another comparator are capable of a plurality of operations including a first operation and a second operation,
wherein the first operation is an operation in which the one comparator compares the pixel signal of the first column and the ramp signal with each other, and the another comparator compares the pixel signal of the second column and the ramp signal with each other; and
wherein the second operation is an operation in which the pixel signal of either one of the first column and the second column is input to the one comparator and the another comparator, the one comparator operates as the first comparator, and the another comparator operates as the second comparator.

19. The image capturing apparatus according to claim 1, wherein the pixel comprises:
   a photoelectric conversion unit configured to generate electric charge corresponding to an amount of incident light;
   a MOS transistor; and
   a transfer switch between the photoelectric conversion unit and a gate of the MOS transistor,
   wherein the MOS transistor serves as an input stage of the first comparator and the second comparator.

20. An image capturing system comprising:
an image capturing apparatus; and
a signal processing unit configured to generate an image by processing a signal output from the image capturing apparatus,
wherein the image capturing apparatus comprises:
   a pixel outputting a pixel signal;
   a ramp-signal supplying unit; and
   an analog-to-digital conversion unit,
   wherein the analog-to-digital conversion units comprises:
      a first comparator including input nodes to receive the pixel signal and the ramp signal, and configured to perform first comparison that is comparison between the pixel signal and the ramp signal and to output a first comparison result signal indicating a result of the first comparison; and
      a second comparator including input nodes to receive the pixel signal and the ramp signal, and configured to perform second comparison that is comparison between the pixel signal and the ramp signal and to output a second comparison result signal indicating a result of the second comparison; and
      an offset imparting unit including connected node that is connected to one input node of the input nodes of the first comparator and the second comparator, and configured to impart an offset to at least one of the pixel signal and the ramp signal to be input to either one of the first comparator and the second comparator, so that the first comparison result signal and the second comparison result signal change in signal level in order due to the offset during an analog-to-digital conversion period from start of a change in potential of the ramp signal to end of the change,
   wherein the second comparator is in a non-operating state during a period from start of the analog-to-digital conversion period until the signal level of the first comparison result signal changes,
   wherein the second comparator is set to be an operating state in correspondence with a change in the signal level of the first comparison result signal to perform the second comparison, and
   wherein current consumption per unit time of the first comparator during the first comparison is lower than current consumption per unit time of the second comparator during the second comparison.

21. The image capturing apparatus according to claim 1, wherein the connected node of the offset imparting unit is connected to one input node of the input nodes of the first comparator, and configured an offset to at least one of the pixel signal and the ramp signal to be input to the first comparator.

22. The image capturing apparatus according to claim 2, wherein the offset imparting unit comprises:
   a switch configured to change a gate width of one input stage of the first differential pair by controlling the conduction and non-conduction of the switch.

23. The image capturing apparatus according to claim 2, wherein the offset imparting unit comprises:
   a plurality of transistors, and
   a switch configured to change the number of the transistor of one input stage of the first differential pair by controlling the conduction and non-conduction of the switch.

24. The image capturing apparatus according to claim 1, wherein the first comparator is set to a non-operating state after the second comparator is set to an operating state.

25. The image capturing apparatus according to claim 1, a gate size of a transistor which supplies current to the first comparator is smaller than a gate size of a transistor which supplies current to the second comparator.

* * * * *